(12) United States Patent
Jeong et al.

(10) Patent No.: US 10,563,567 B2
(45) Date of Patent: Feb. 18, 2020

(54) RESERVER TANK FOR MOTOR VEHICLE

(71) Applicant: Hanon Systems, Daejeon (KR)

(72) Inventors: Dong Mi Jeong, Daejeon (KR); Seong Woo Jeong, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 16/117,657

(22) Filed: Aug. 30, 2018

(65) Prior Publication Data

US 2019/0063302 A1 Feb. 28, 2019

(30) Foreign Application Priority Data

Aug. 31, 2017 (KR) .................. 10-2017-0111434
Aug. 29, 2018 (KR) .................. 10-2018-0102243

(51) Int. Cl.
*F01P 11/02* (2006.01)
*B60K 11/02* (2006.01)
*B60K 11/00* (2006.01)

(52) U.S. Cl.
CPC ............. *F01P 11/029* (2013.01); *B60K 11/02* (2013.01); *F01P 11/0204* (2013.01); *F01P 11/0285* (2013.01); *B60K 11/00* (2013.01)

(58) Field of Classification Search
CPC .. F01P 11/029; F01P 11/0285; F01P 11/0204; B60K 11/00
See application file for complete search history.

(56) References Cited

U.S. PATENT DOCUMENTS

| 5,570,982 A * | 11/1996 | Lautenschlager ..... E05D 5/0276 411/355 |
| 2001/0045694 A1* | 11/2001 | Hadano ............... B60G 21/0551 267/189 |
| 2005/0077727 A1* | 4/2005 | Folsom .................... F16L 25/14 285/148.23 |
| 2005/0115785 A1* | 6/2005 | Thomas ............... B60G 15/067 188/321.11 |
| 2007/0071379 A1* | 3/2007 | Hong ...................... F16C 17/26 384/276 |
| 2012/0118527 A1* | 5/2012 | Reed ...................... F01P 11/029 165/41 |

FOREIGN PATENT DOCUMENTS

JP 2008237143 A * 10/2008

* cited by examiner

*Primary Examiner* — Jacob M Amick
*Assistant Examiner* — Charles Brauch
(74) *Attorney, Agent, or Firm* — Norton Rose Fulbright US LLP; James R. Crawford

(57) ABSTRACT

Provided is a reserver tank for a motor vehicle, more particularly, a reserver tank for a motor vehicle including a lateral coupling portion for easy assembly and installation of the reserver tank in an internal portion of an engine room.

24 Claims, 9 Drawing Sheets

RESERVER TANK FOR MOTOR VEHICLE

CROSS-REFERENCE TO RELATED APPLICATIONS

This application claims priority under 35 U.S.C. § 119 to Korean Patent Application No. 10-2017-0111434, filed on Aug. 8, 2017, and No. 10-2018-0102243, filed on Aug. 29, 2018, in the Korean Intellectual Property Office, the disclosure of which is incorporated herein by reference in its entirety.

TECHNICAL FIELD

The following disclosure relates to a reserver tank for a motor vehicle and, more particularly, to a reserver tank for a motor vehicle including a lateral coupling portion for easy assembly and installation of the reserver tank in an internal portion of an engine room.

BACKGROUND

In general, in a motor vehicle with an internal combustion engine mounted therein, heat generated while an engine is driven is conducted to a cylinder head, a piston, a valve, or the like and, thus, when temperature of these components is excessively enhanced, strength of a component is degraded along with thermal expansion or deterioration, a life span of an engine is reduced, and a combustion state is also degraded and, accordingly, knocking or preignition occurs to degrade output of the engine.

When an engine is unstably cooled, a lubrication function is degraded, e.g., an oil film of an inner circumference of a cylinder is cut and engine oil spoils and, thus, abnormal abrasion of the cylinder occurs and a piston is also adhered via melting to an internal wall surface of the cylinder.

To cool the engine, a water cooling-type cooling device is generally installed in a motor vehicle.

The water cooling-type cooling device may lower temperature of cooling water while the cooling water is circulated in a cylinder block and a cylinder head by a water pump and, to dissipate heat of the cooling water, the water cooling-type cooling device may include a radiator, a cooling fan, a thermostat, and so on.

When an internal pressure of a radiator is excessively enhanced, cooling water inside the radiator is discharged to a reserver tank (an auxiliary tank) and, when cooling water inside the radiator is insufficient, cooling water is injected to the reserver tank to supply the cooling water to the radiator.

FIG. 1 is a perspective view of a single supply of a general reserver tank 10 for a motor vehicle. FIG. 2 is an exploded perspective view of a lateral mount 20. FIG. 3 is an enlarged perspective view of the lateral mount 20. As shown in FIG. 1, the reserver tank 10 may include a body 10a for accommodating cooling water and an injection portion 15 for injecting cooling water. A fixing portion for fixing the reserver tank 10 to an internal portion of an engine room may be disposed on the body 10a, an upper mount 11 positioned at an upper portion of the body 10a may include a coupling hole for coupling a screw or a bolt, and the lateral mount 20 disposed at a lateral surface of the body 10a may have a simple fitting-type coupling structure for being fitted and fixed to a screw protrusion formed on the engine room because screw or bolt assembly is difficult due to a narrow internal portion of the engine room.

The lateral mount 20 is now described in detail with reference to FIGS. 2 and 3. The lateral mount 20 includes a mount body 20a formed on a lateral surface of the body 10a, a washer plate 21 fixed to one surface of the mount body 20a and having a clip 21b that is coupled to the above screw protrusion and is formed of an elastic material to prevent from being separated, and a rib plate 22 on which a plurality of coupling protrusions 22a are formed to firmly fix the washer plate 21. The rib plate 22 may be coupled to the other surface of the mount body 20a and an end portion of the coupling protrusions 22a may be ultrasonic-welded to fix the washer plate 21 to the mount body 20a in a state in which the coupling protrusions 22a penetrate a through hole 20c of the mount body 20a and a through hole 20a of the washer plate 21.

The conventional reserver tank 10 including the above lateral mount 20 includes many components to increase mold costs and requires an ultrasonic melt-adhering process during coupling of the rib plate 22, which acts as a factor for increasing manufacturing costs due to increased labor cost or processing cost.

SUMMARY

An embodiment of the present invention is directed to providing a reserver tank for a motor vehicle, which includes an insert bush that is simply fitted and coupled to a lateral mount and installs the reserver tank in an engine room via fitting to a screw protrusion formed in an internal portion of the engine room through the insert bush.

In one general aspect, a reserver tank 100 for a motor vehicle, for storing cooling water overflowing by excessive pressure of a radiator and for accommodating cooling water to maintain a water level of cooling water inside the radiator, the reserver tank 100 may include mounts 110 and 200 for fixing the reserver tank 100, wherein the mounts 110 and 200 includes a coupling hole 205 into which a screw protrusion 500 formed in the internal portion of the engine room is inserted, and an insert bush 210 having an external surface inserted into the coupling hole 205 and an internal surface into which the screw protrusion 500 is inserted, and for applying elasticity inward to fix the screw protrusion 500.

The insert bush 210 includes an elastic protrusion 222 that protrudes to apply elasticity inward.

The elastic protrusion 222 has a smaller internal diameter on the insert bush 210 than a diameter of the screw protrusion 500.

The mounts 110 and 200 includes, an upper mount 110 formed at an upper portion of the tank body 101 for accommodating cooling water to fix the reserver tank 100 to an internal portion of an engine room, and a lateral mount 200 formed on a lateral surface of the tank body 101 to fix the reserver tank 100 to the internal portion of the engine room, wherein the insert bush 210 is included in any one of the upper mount 110 and the lateral mount 200.

The reserver tank 100 includes a cooling water injection portion 150 for replenishing cooling water in the tank body 101.

The screw protrusion 500 is coupled to penetrate a through hole 300 formed in the internal portion of the engine room and the coupling hole 205, and wherein the through hole 300 has a smaller diameter than the coupling hole 205 to prevent separate of the insert bush 210.

The elastic protrusion 222 is symmetrical in a coupling direction of the insert bush 210.

Protrusion slits 223 penetrating in a thickness direction of the insert bush 210 are formed at opposite sides of the elastic protrusion 222.

The insert bush 210 is formed by bending a bush body 211 formed like a plate in a circular shape and includes a fixing protrusion 213 formed at one end portion of the bush body 211 to protrude in an outer radial direction of the insert bush 210.

The coupling hole 205 includes a fixing groove 206 recessed in an outer radial direction from the coupling hole 205 to insert the fixing protrusion 213 into the fixing groove 206.

The fixing groove 206 is formed with a smaller width than a width of the fixing protrusion 213.

The elastic protrusion 222 is symmetrical in up and down directions based on the fixing protrusion 213.

The mounts 110 and 200 are formed by a predetermined distance from one end portion to the other end portion of the coupling hole 205 and includes an end projection 203 with a smaller diameter than a diameter of an inner circumference of the coupling hole 205.

The diameter of the inner circumference of the end projection 203 is equal to or less than a diameter of an outer circumference of the insert bush 210.

The elastic protrusion 222 are formed by pressing the external surface of the insert bush 210 in an inner radial direction.

DETAILED DESCRIPTION OF MAIN ELEMENTS

Figure 1:
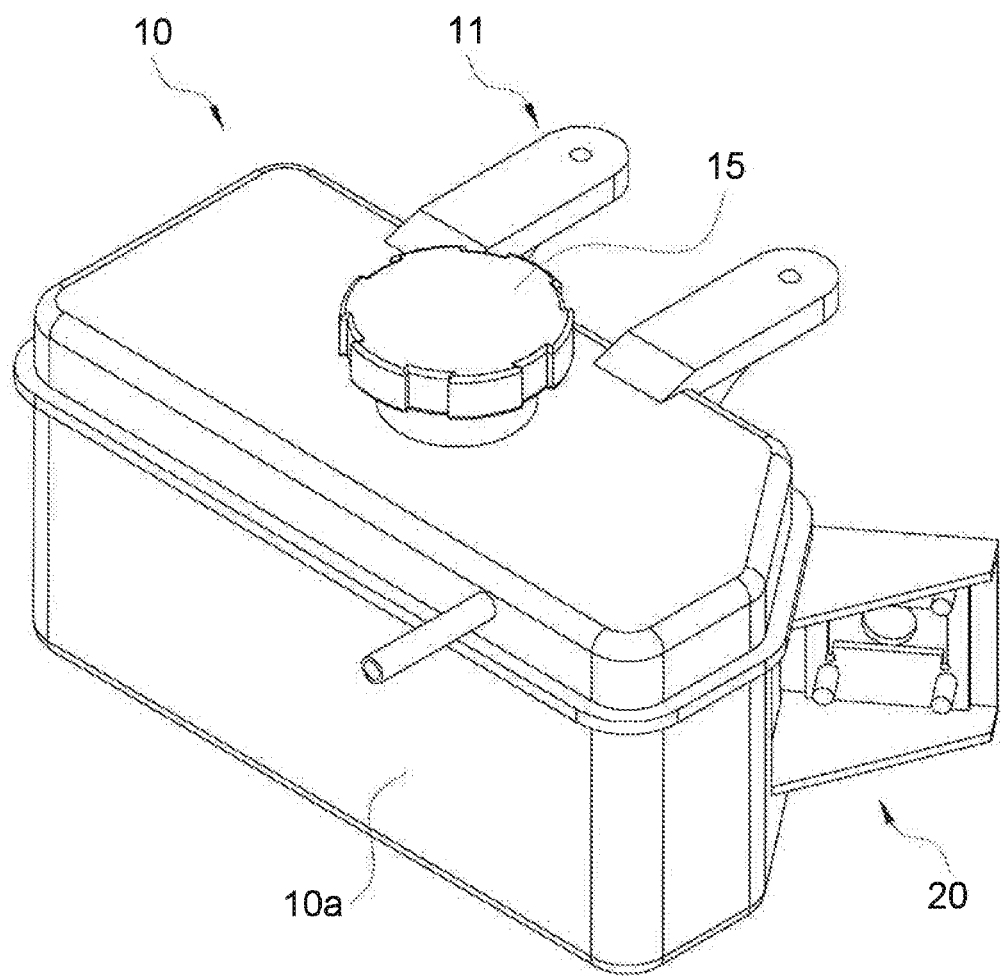
FIG. 1 is a perspective view of a conventional reserver tank.
Figure 2:
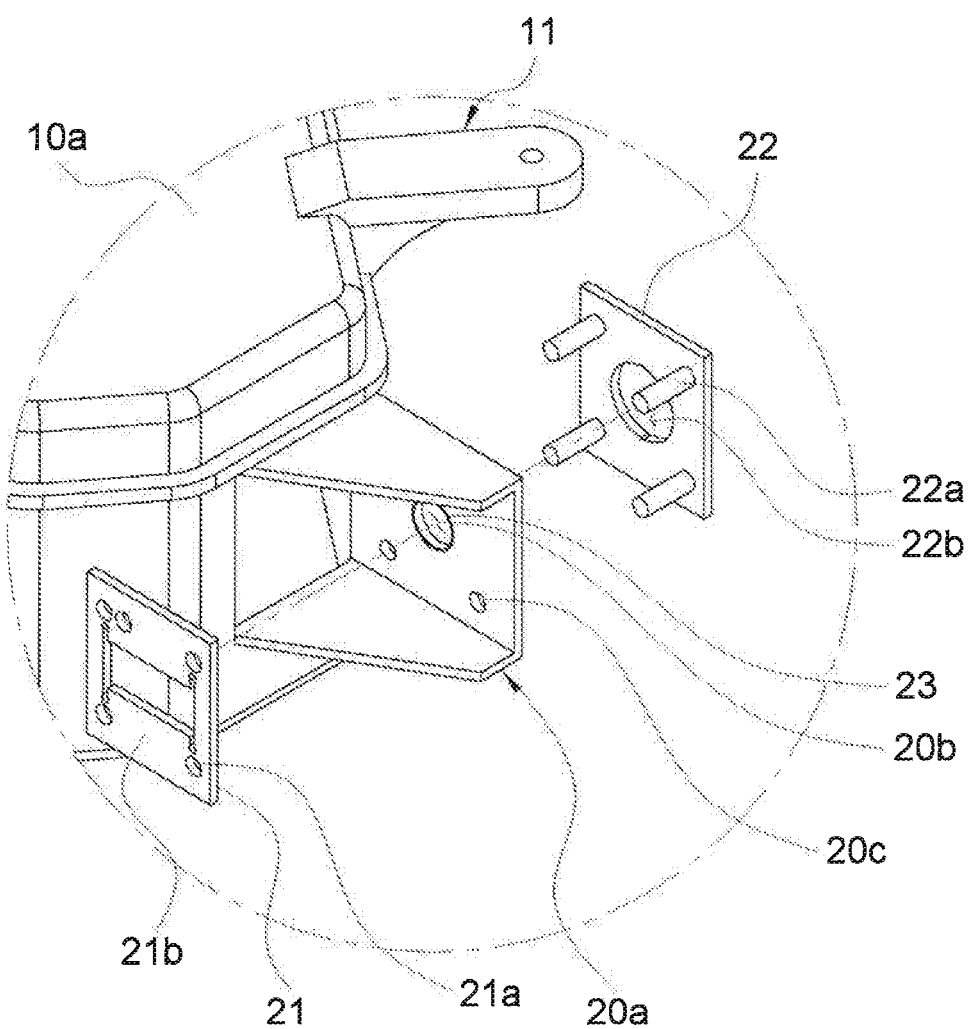
FIG. 2 is an exploded perspective view of a lateral mount of a conventional reserver tank.
Figure 3:
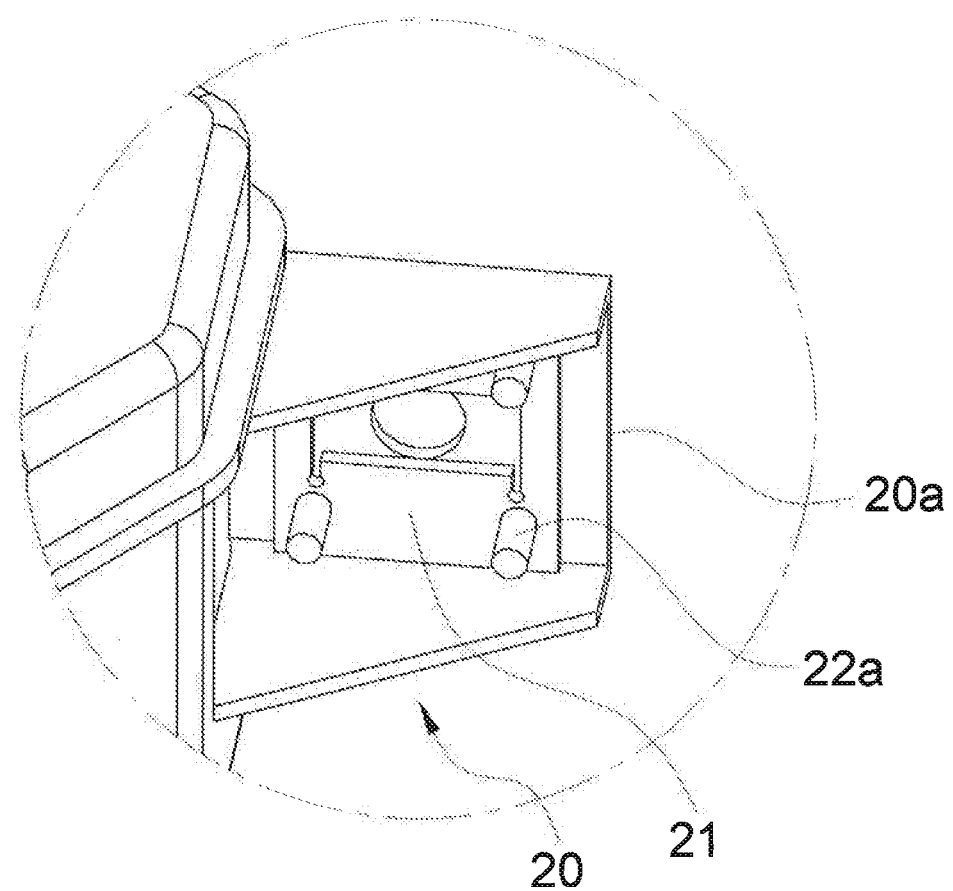
FIG. 3 is a perspective view of a lateral mount of a conventional reserver tank.

100: reserver tank
101: tank body
110: upper mount
150: injection portion
200: lateral mount
201: mount body
202: coupling hole inner periphery
203: end projection
205: coupling hole
206: fixing groove
210: insert bush
211: bush body
213: fixing protrusion
215: fixing hole
222: elastic protrusion
223: protrusion slit
300: through hole
500: screw protrusion

DETAILED DESCRIPTION OF EMBODIMENTS

The present invention will now be described more fully with reference to the accompanying drawings, in which exemplary embodiments of the invention are shown.

Figure 4:
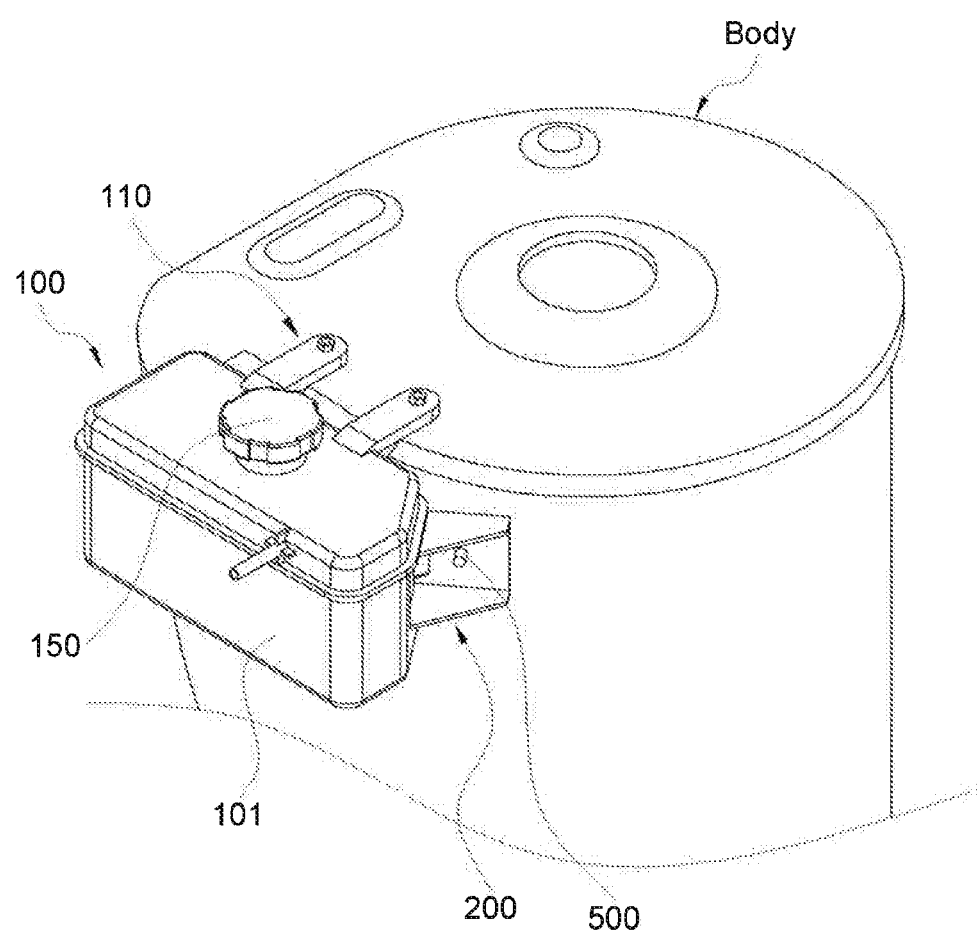
FIG. 4 is a perspective view of a reserver tank according to an exemplary embodiment of the present invention.
Figure 5:
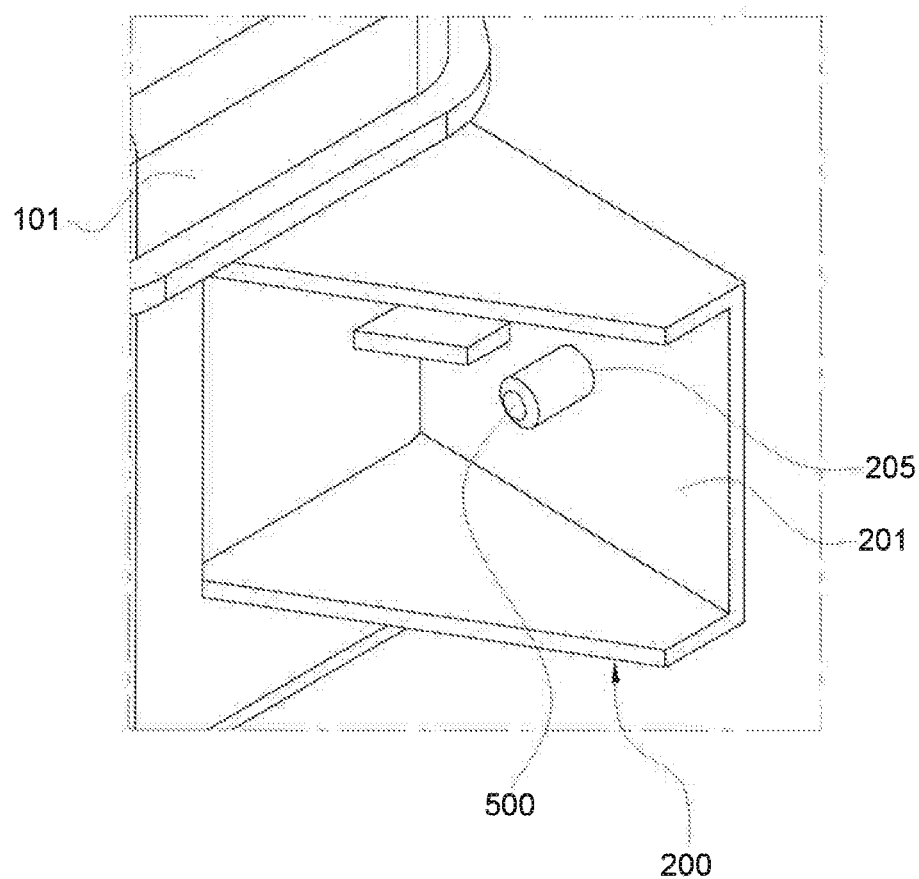
FIG. 5 is a front view of a reserver tank according to an exemplary embodiment of the present invention.
Figure 6:
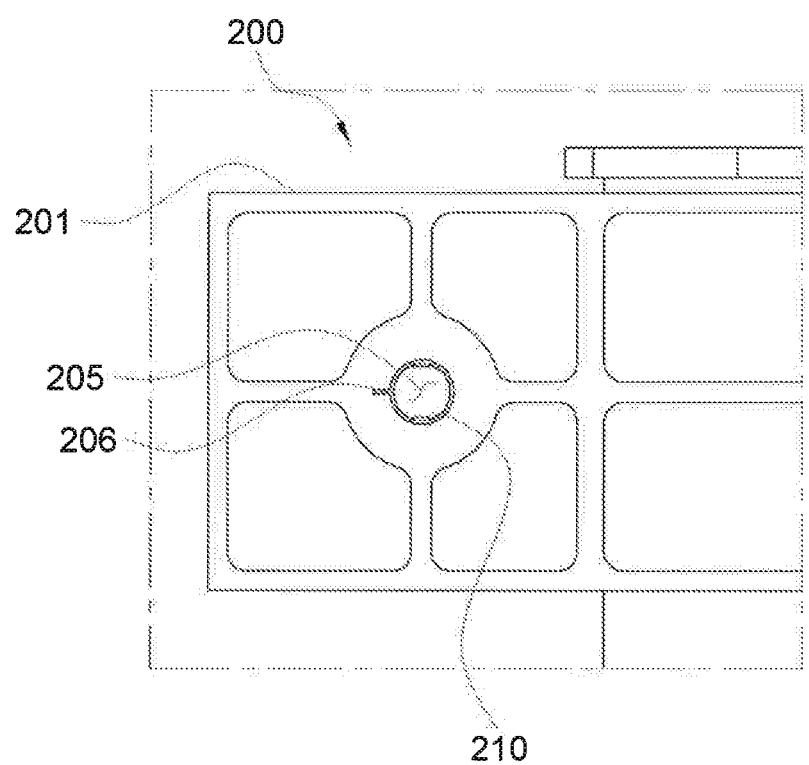
FIG. 6 is a perspective view of a lateral mount according to an exemplary embodiment of the present invention.

FIG. 4 is a perspective view of a reserver tank 100 for a motor vehicle according to an exemplary embodiment of the present invention. FIG. 5 is a perspective view of a lateral mount 200 of the reserver tank 100 for a motor vehicle according to an exemplary embodiment of the present invention. FIG. 6 is a front view of the lateral mount 200.

As shown in FIG. 4, the reserver tank 100 may include a body 101 for accommodating cooling water and an injection portion 150 for injecting cooling water. A mounts 110 and 200 for fixing the reserver tank 100 to an internal portion 'Body' of an engine room may be disposed on the body 101, consist of an upper mount 110 and the lateral mount 200. The upper mount 110 disposed at an upper portion of the body 101 may include a coupling hole for coupling a screw or a bolt, and the lateral mount 200 disposed at a lateral surface of the body 101 may have a simple fitting-type coupling structure for being fitted and fixed to a screw protrusion 500 formed in the internal portion 'Body' of the engine room because screw or bolt assembly is difficult due to a narrow internal portion of the engine room.

The lateral mount 200 is now described in detail with reference to FIGS. 5 and 6. The lateral mount 200 may include a mount body 201 formed on a lateral surface of the body 101, and an insert bush 210 that is inserted into a coupling hole 205 formed on the mount body 201 to enable the screw protrusion 500 to be inserted and applies elasticity to the screw protrusion 500 to firmly couple the mount body 201 and the screw protrusion 500.

As shown in the drawings, in the reserver tank 100 according to the present invention, the lateral mount 200 may be completely assembled simply using a process of inserting the insert bush 210 into the coupling hole 205 of the lateral mount 200 and the reserver tank 100 may be installed in the internal portion 'Body' of the engine room by simply fitting and fixing the lateral mount 200 with the insert bush 210 being inserted thereinto to the screw protrusion 500.

Hereinafter, a detailed structure of the insert bush 210 configured above and a coupling structure between the insert bush 210 and the lateral mount 200 are described in detail.

Figure 7:
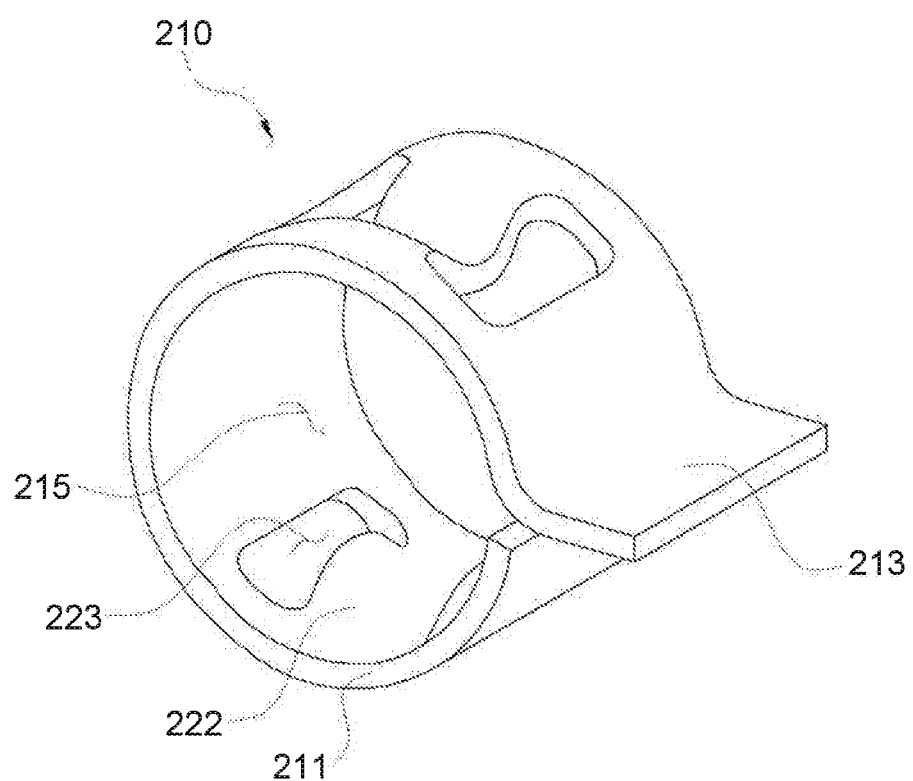
FIG. 7 is a perspective view of an insert bush according to an exemplary embodiment of the present invention.

FIG. 7 is a perspective view of the insert bush 210 according to an exemplary embodiment of the present invention. As shown in the drawing, the insert bush 210 may be formed like a thick ring in which an insertion fixing hole 215 into which the screw protrusion 500 is to be inserted is formed. The insert bush 210 may be formed by bending and molding a bush body 211 formed like a flat plate, in the circular form. The insert bush 210 may include an elastic protrusion 222 that protrudes toward an inner periphery. The elastic protrusion 222 may be configured to apply elasticity to the screw protrusion 500 to firmly couple the insert bush 210 and the screw protrusion 500 when the screw protrusion 500 is inserted. Therefore, the elastic protrusion 222 has a smaller internal diameter $d_6$ on the insert bush 210 than a diameter $d_5$ of the screw protrusion 500. (see FIG. 9)

The elastic protrusion 222 may be formed in a thickness direction of the insert bush 210 and may be formed by pressing the insert bush 210 toward the inner periphery between a pair of protrusion slits 223 formed to be spaced apart from each other in a circumferential direction of the insert bush 210. The insert bush 210 may include a fixing protrusion 213 that protrudes in an outer radial direction and the fixing protrusion 213 may be tightly fitted to a fixing groove 206 (refer to FIG. 6) that is recessed in an outer radial direction from the inner periphery of the coupling hole 205 to firmly couple the insert bush 210 and the mount body 201. Therefore, the fixing groove 206 is formed with a smaller width than a width of the fixing protrusion 213.

Figure 8:
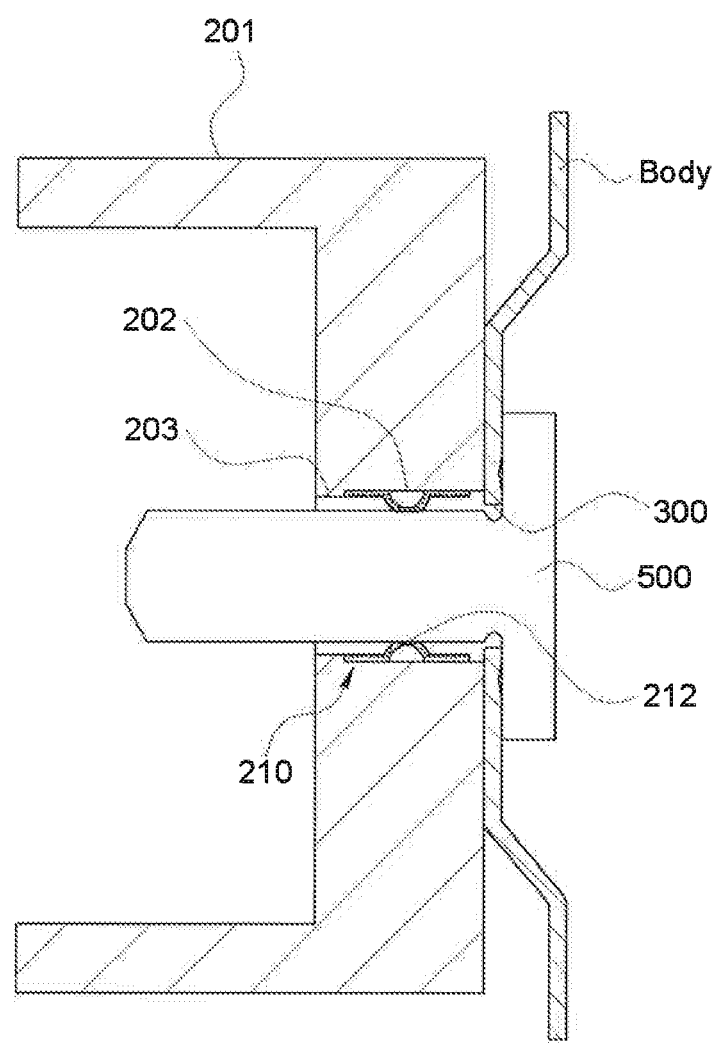
FIG. 8 is a cross-sectional view of a lateral mount according to an exemplary embodiment of the present invention.
Figure 9:
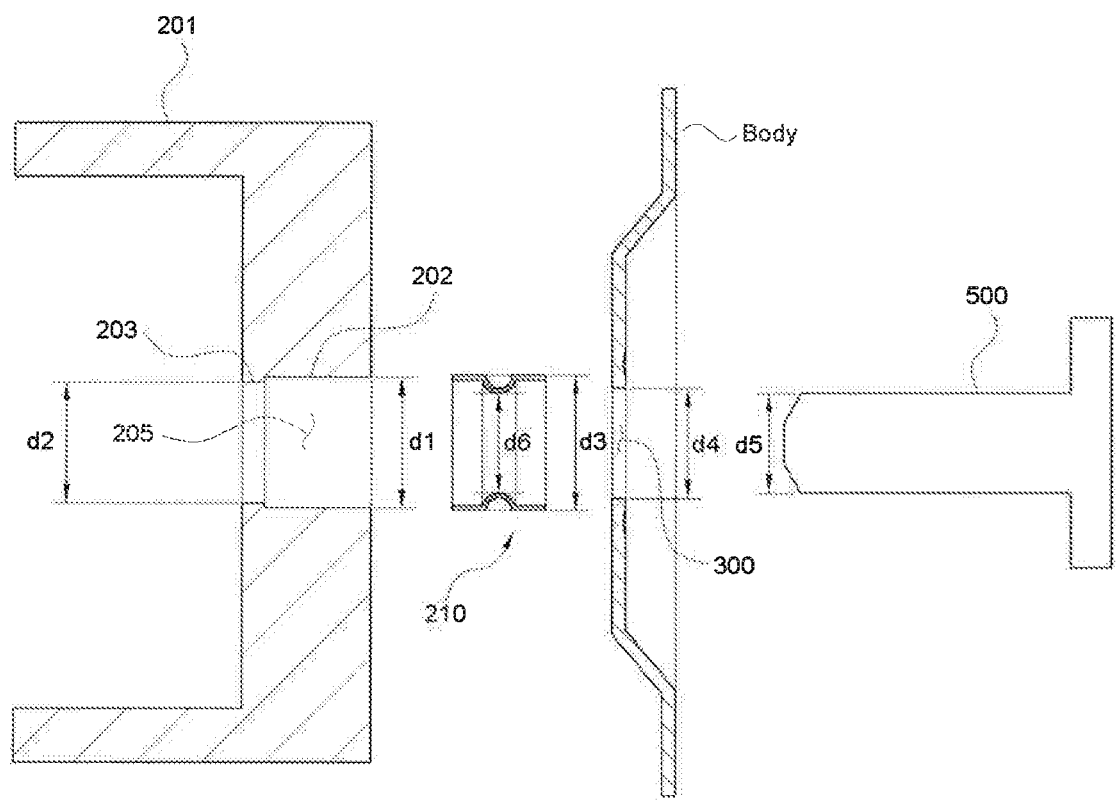
FIG. 9 is an exploded cross-sectional view of a lateral mount according to an exemplary embodiment of the present invention.

FIG. 8 is a cross-sectional view of the insert bush 210 inserted into the mount body 201 and the screw protrusion 500 that is inserted into the insert bush 210 and pressed by the elastic protrusion 222. FIG. 9 is an exploded cross-sectional view.

As shown in the drawing, the mount body 201 may include the coupling hole 205 that is formed to penetrate therethrough to enable the insert bush 210 and the screw protrusion 500 to be inserted into the coupling hole 205, and the insert bush 210 may be fitted and fixed to an inner periphery 202 of the coupling hole 205. The screw protrusion 500 may be fixed through a through hole 300 formed in the internal portion of the engine room. The screw protrusion 500 protrudes into the engine room, and may be internally fixed from the outside of the engine room. The through hole 300 has a smaller diameter d3 than the diameter d1 of the coupling hole 205 to prevent separate of the insert bush 210. (see FIG. 9)

In this case, an end projection 203 may be formed by a predetermined distance from one end portion to the other end portion of the coupling hole 205. Accordingly, the insert bush 210 may be inserted into and fixed to one side from the other side (at a coupling surface side) of the mount body 201 and, when the screw protrusion 500 is inserted into the insert bush 210 by the end projection 203, the insert bush 210 may be prevented from slipping to one side of the coupling hole 205. The diameter d2 of the inner circumference of the end projection 203 is equal to or less than a diameter d1 of an outer circumference of the insert bush 210. (see FIG. 9)

Elastic protrusions 222 of the insert bush 210 may be symmetrical in a thickness direction of the insert bush and, thus, there is no problem in terms of a function even if one and the other sides of the insert bush 210 are reversed. That is, misassembly of the insert bush 210 may be prevented. In addition, a washer plate included in a conventional lateral mount is capable of being assembled only in one direction and, thus, it is cumbersome to damage the water plate to separate the reserver tank after the washer plate is assembled once. However, the insert bush 210 according to the present invention is capable of being assembled in opposite directions and, thus, the insert bush 210 is easily separated as well as being easily mounted and needs not to be damaged while being separated.

The reserver tank for a motor vehicle configured above according to the present invention is configured in such a way that the lateral mount includes a single supply of an insert bush, thereby reducing manufacturing costs along with reduction in the number of components.

The reserver tank may be completely assembled simply by inserting the insert bush into a mount and, thus, manufacturing cost may be reduced due to lowered labor cost and lowered processing cost.

The insert bush may be symmetrically formed to remove assembling directivity to prevent misassembly.

A flange may be formed on an insertion portion of the insert bush of the mount to prevent separation of the insert bush during installation of the mount.

It will be obvious to those skilled in the art to which the present invention pertains that the present invention described above is not limited to the above-mentioned exemplary embodiments and the accompanying drawings, but may be variously substituted, modified, and altered without departing from the scope and spirit of the present invention.

What is claimed is:

1. A reserver tank for a motor vehicle, for storing cooling water overflowing by excessive pressure of a radiator and for accommodating cooling water to maintain a water level of cooling water inside the radiator, the reserver tank comprising:
   mounts and for fixing the reserver tank,
   wherein the mounts and include:
   a coupling hole into which a screw protrusion formed in the internal portion of an engine room is inserted; and
   an insert bush having an external surface inserted into the coupling hole and an internal surface into which the screw protrusion is inserted, and for applying elastically inward to fix the screw protrusion;
   wherein the insert bush includes an elastic protrusion that protrudes to apply elasticity inward, and
   wherein the insert bush is formed by bending a bush body formed like a plate in a circular shape and includes a fixing protrusion formed at one end portion of the bush body to protrude in an outer radial direction of the insert bush.

2. A reserver tank for a motor vehicle, for storing cooling water overflowing by excessive pressure of a radiator and for accommodating cooling water to maintain a water level of cooling water inside the radiator, the reserver tank comprising:
   mounts and for fixing the reserver tank,
   wherein the mounts and include:
   a coupling hole into which a screw protrusion formed in the internal portion of an engine room is inserted; and
   an insert bush having an external surface inserted into the coupling hole and an internal surface into which the screw protrusion is inserted, and for applying e elastically inward to fix the screw protrusion, wherein the insert bush includes an elastic protrusion that protrudes to apply elasticity inward; and
   wherein the elastic protrusion is formed by pressing the external surface of the insert bush in an inner radial direction.

3. The reserver tank of claim 2, wherein the elastic protrusion has a smaller internal diameter on the insert bush than a diameter of the screw protrusion.

4. The reserver tank of claim 1, wherein the mounts and include:
   an upper mount formed at an upper portion of the tank body for accommodating cooling water to fix the reserver tank to an internal portion of an engine room; and
   a lateral mount formed on a lateral surface of the tank body to fix the reserver tank to the internal portion of the engine room,
   wherein the insert bush is included in any one of the upper mount and the lateral mount.

5. The reserver tank of claim 4, wherein the reserver tank includes a cooling water injection portion for replenishing cooling water in the tank body.

6. The reserver tank of claim 2, wherein the screw protrusion is coupled to penetrate a through hole formed in the internal portion of the engine room and the coupling hole; and wherein the through hole has a smaller diameter than the coupling hole to prevent separation of the insert bush.

7. The reserver tank of claim 2, wherein the elastic protrusion is symmetrical in a coupling direction of the insert bush.

8. The reserver tank of claim 2, wherein protrusion slits penetrating in a thickness direction of the insert bush are formed at opposite sides of the elastic protrusion.

9. The reserver tank of claim 8, wherein the coupling hole includes a fixing groove recessed in an outer radial direction from the coupling hole to insert the fixing protrusion into the fixing groove.

10. The reserver tank of claim 9, wherein the fixing groove is formed with a smaller width than a width of the fixing protrusion.

11. The reserver tank of claim 9, wherein the elastic protrusion is symmetrical in up and down directions based on the fixing protrusion.

12. The reserver tank of claim 1, the mounts and are formed by a predetermined distance from one end portion to the other end portion of the coupling hole and includes an end projection with a smaller diameter than a diameter of an inner circumference of the coupling hole.

13. The reserver tank of claim 12, wherein the diameter of the inner circumference of the end projection is equal to or less than a diameter of an outer circumference of the insert bush.

14. The reserver tank of claim 1, wherein the elastic protrusion has a smaller internal diameter on the insert bush than a diameter of the screw protrusion.

15. The reserver tank of claim 2, wherein the mounts and include:
   an upper mount formed at an upper portion of the tank body for accommodating cooling water to fix the reserver tank to an internal portion of an engine room; and
   a lateral mount formed on a lateral surface of the tank body to fix the reserver tank to the internal portion of the engine room,
   wherein the insert bush is included in any one of the upper mount and the lateral mount.

16. The reserver tank of claim 15, wherein the reserver tank includes a cooling water injection portion for replenishing cooling water in the tank body.

17. The reserver tank of claim 2, wherein the screw protrusion is coupled to penetrate a through hole formed in the internal portion of the engine room and the coupling hole; and
   wherein the through hole has a smaller diameter than the coupling hole to prevent separation of the insert bush.

18. The reserver tank of claim 1, wherein the elastic protrusion is symmetrical in a coupling direction of the insert bush.

19. The reserver tank of claim 1, wherein protrusion slits penetrating in a thickness direction of the insert bush are formed at opposite sides of the elastic protrusion.

20. The reserver tank of claim 19, wherein the coupling hole includes a fixing groove recessed in an outer radial direction from the coupling hole to insert the fixing protrusion into the fixing groove.

21. The reserver tank of claim 20, wherein the fixing groove is formed with a smaller width than a width of the fixing protrusion.

22. The reserver tank of claim 21, wherein the elastic protrusion is symmetrical in up and down directions based on the fixing protrusion.

23. The reserver tank of claim 2, the mounts and are formed by a predetermined distance from one end portion to the other end portion of the coupling hole and includes an end projection with a smaller diameter than a diameter of an inner circumference of the coupling hole.

24. The reserver tank of claim 23, wherein the diameter of the inner circumference of the end projection is equal to or less than a diameter of an outer circumference of the insert bush.

* * * * *